United States Patent
Bylsma et al.

(10) Patent No.: US 7,346,008 B1
(45) Date of Patent: Mar. 18, 2008

(54) METHOD AND APPARATUS FOR DATA DRIVEN NETWORK MANAGEMENT

(75) Inventors: Trevor K Bylsma, Kanata (CA); Susan K Matheson, Nepean (CA); Jeff Wilker, Kanata (CA)

(73) Assignee: Alcatel Canada Inc., Kanata, Ontario (CA)

( * ) Notice: Subject to any disclaimer, the term of this patent is extended or adjusted under 35 U.S.C. 154(b) by 0 days.

(21) Appl. No.: 09/418,647

(22) Filed: Oct. 15, 1999

(51) Int. Cl.
*H04L 12/28* (2006.01)

(52) U.S. Cl. ............... 370/255; 370/254; 370/395.31

(58) Field of Classification Search ........... 370/254, 370/255, 351, 401, 410, 411, 442, 271, 384, 370/426, 522, 523, 524, 525, 526, 527, 498, 370/360, 467, 528, 395.31; 379/112.01, 379/112.05, 133, 134; 709/220, 221, 223–226, 709/313

See application file for complete search history.

(56) References Cited

U.S. PATENT DOCUMENTS

| | | | |
|---|---|---|---|
| 5,027,345 A * | 6/1991 | Littlewood et al. ........ 370/383 |
| 5,261,044 A * | 11/1993 | Dev et al. ............... 345/855 |
| 5,333,183 A * | 7/1994 | Herbert ............... 379/112.07 |
| 5,490,252 A | 2/1996 | Macera et al. |
| 5,550,816 A * | 8/1996 | Hardwick et al. ........ 370/397 |
| 5,561,769 A * | 10/1996 | Kumar et al. ........... 709/202 |
| 5,594,792 A * | 1/1997 | Chouraki et al. ........ 379/269 |
| 5,664,107 A * | 9/1997 | Chatwani et al. ........ 709/224 |
| 5,729,685 A * | 3/1998 | Chatwani et al. ........ 709/224 |
| 5,758,083 A | 5/1998 | Singh et al. |
| 5,774,689 A | 6/1998 | Curtis et al. |
| 5,796,951 A | 8/1998 | Hamner et al. |
| 5,799,317 A * | 8/1998 | He et al. ............... 707/104.1 |
| 5,844,895 A * | 12/1998 | Gradisching ............ 370/385 |
| 5,905,715 A | 5/1999 | Azarmi et al. |
| 5,940,393 A * | 8/1999 | Duree et al. ............. 370/392 |
| 6,018,516 A | 1/2000 | Packer |
| 6,058,307 A * | 5/2000 | Garner ................ 455/428 |
| 6,088,777 A * | 7/2000 | Sorber ................ 711/171 |
| 6,104,868 A * | 8/2000 | Peters et al. ........... 709/202 |
| 6,112,085 A * | 8/2000 | Garner et al. .......... 455/428 |
| 6,195,425 B1 | 2/2001 | Farris |
| 6,233,610 B1 * | 5/2001 | Hayball et al. ......... 709/223 |

(Continued)

FOREIGN PATENT DOCUMENTS

EP       0 939 517 A1      1/1999

OTHER PUBLICATIONS

M. Rose and K. McCloghrie; Network Working Group Request for Comments: 1155; Structure and Identification of Management Information for TCP/IP-based Internets; May 1990; pp. 5-7, 10-14 and 16-18.*

(Continued)

*Primary Examiner*—Wing Chan
*Assistant Examiner*—Mark A. Mais

(57) ABSTRACT

A method and apparatus for communicating functional characteristics of nodes in a communications network to the network manager in the network is presented. This is accomplished by defining a bit field that indicates whether or not a particular functions or services are supported by a particular node. The bit field for each node within the communications network is communicated to the network manager which stores the bit fields for each node within a database. The database is then utilized to perform network management functions, as it informs the network manager whether a particular service/feature is available on the node to which the bit field corresponds.

22 Claims, 2 Drawing Sheets

U.S. PATENT DOCUMENTS

| | | | |
|---|---|---|---|
| 6,272,129 | B1 | 8/2001 | Dynarski et al. |
| 6,272,150 | B1 | 8/2001 | Hrastar et al. |
| 6,389,464 | B1 * | 5/2002 | Krishnamurthy et al. ... 709/220 |
| 6,452,915 | B1 * | 9/2002 | Jorgensen .................. 370/338 |
| 6,553,515 | B1 * | 4/2003 | Gross et al. ................. 714/47 |
| 2001/0043568 | A1 | 11/2001 | McHale et al. |
| 2002/0018473 | A1 | 2/2002 | Hassell et al. |

OTHER PUBLICATIONS

M. Rose and K. McCloghrie; Networking Group Request for Comments: 1155; Structure and Identification of☐☐Management Information for TCP/IP-based Internets; May 1990; pp. 5-7, 10-14 and 16-18.* http://msdn.microsoft.com/library/default.asp?url=/library/en-us/snmp/snmp/the_snmp_management_information_base_mib_asp.* http://www.webopedia.com/TERM/M/MIB.html.* http://www.tcpipguide.com/free/t_TCPIPMIBObjectsCharacteristicsandObjectTypes.htm.* http://www.wirelessdevnet.com/career/detail.phtml?type=2&id=3928.* http://msdn.microsoft.com/library/default.asp?url=/library/en-us/snmp/snmp/the_snmp_management_information_base_mib_asp, date unavailable.* http://www.webopedia com/TERM/M/MIB.html, date unavailable.* http://www.tcpipguide.com/free/t_TCPIPMIBObjectsObjectCharacteristicsandObjectTypes.htm, date unavailable.* http://www.tcpipguide.com/free/t_TCPIPMIBObjectsObjectCharacteristicsandObjectTypes-2.htm, date unavailable.* http://www.wirelessdevnet.com/career/detail.phtml?type=2&id=3928, date unavailable.* http://64.233.187.104/search?q=cache:9fJQ7buhBoEJ:www.vertel.com/cases/q_adapter.pdf+CMIP+TMN+wireless+&hl=en, date unavailable.*

Weinstock J et al: "An object-oriented approach to the management of distributed application systems", Computer Networks and ISDN Systems, North Holland Publishing, Amsterdam NL, vol. 29, Nr. 16, pp. 1869-1879 XP004107249 ISSN: 0169-7552.

* cited by examiner

METHOD AND APPARATUS FOR DATA DRIVEN NETWORK MANAGEMENT

FIELD OF THE INVENTION

The invention relates generally to communication systems and more particularly to a method and apparatus for data driven network management in such communication systems.

BACKGROUND OF THE INVENTION

Communications networks are evolving rapidly, and network designers are constantly challenged to improve the efficiency, speed, and overall performance of their networks. As such, developers are continuously implementing new communication switches, or nodes, with additional functional capabilities. In order to accurately manage communication networks that include a plurality of nodes, the network manager must understand the functional characteristics of each of the nodes within the network. In prior art solutions, such characteristics were typically communicated to the network manager by providing the identity or node-type of the various nodes included in the network to the network manager.

The information communicated to the network manager in prior art solutions typically did not include all the functional capabilities that a specific node might possess. It was up to the network manager to determine the functional characteristics for a node based on its node-type or identity. For example, each node of node type X was known to support certain functional characteristics, and the network manager included a reference (often hard-coded in operational software) to node type X that was referenced to determine the functional characteristics of any nodes in the network of node type X. Thus, each time a new node configuration was designed and implemented, the device performing the network management in the communication system would also have to be revised in order to include the functional characteristics for the newly developed nodes. In many cases this caused support of newly developed nodes to be delayed. This delay can be attributed to the time required to make the changes to the network manager, and possibly due to the desire to limit the number of revisions to a particular network management device. In addition to the time delays, revising the network manager adds a risk of interfering with the current functionality of the network manager. Quality concerns such as these increase the costs associated with altering the network manager to support the new node technology.

Therefore, a need exists for a method and apparatus for data driven network management such that revisions to the network manager are not required each time a new node is developed.

DESCRIPTION OF A PREFERRED EMBODIMENT OF THE INVENTION

Generally, the present invention provides a method and apparatus for communicating functional characteristics of nodes in a communications network to the network manager in the network. This is accomplished by defining a bit field that indicates whether or not particular functions or services are supported by a particular node. The bit field for each node within the communications network is communicated to the network manager, which stores the bit fields for each node within a database. The database is then utilized to perform network management functions, as it informs the network manager whether a particular service/feature is available on the node to which the bit field corresponds.

By using the bit field to communicate functional characteristics of nodes within the communications network, the need to revise the network manager each time a new switch (node) is developed is avoided. As long as the new switch does not include any new functionality not supported by the bit field, the node is only required to send an appropriately configured bit field to the network manager to indicate the node's functionality. The network manager does not have to identify the functional characteristics of the particular node using the node type as was the case with prior art systems. As such, newly developed nodes are immediately supported by the network manager, and updates to any software within the network manager are avoided.

Figure 1:
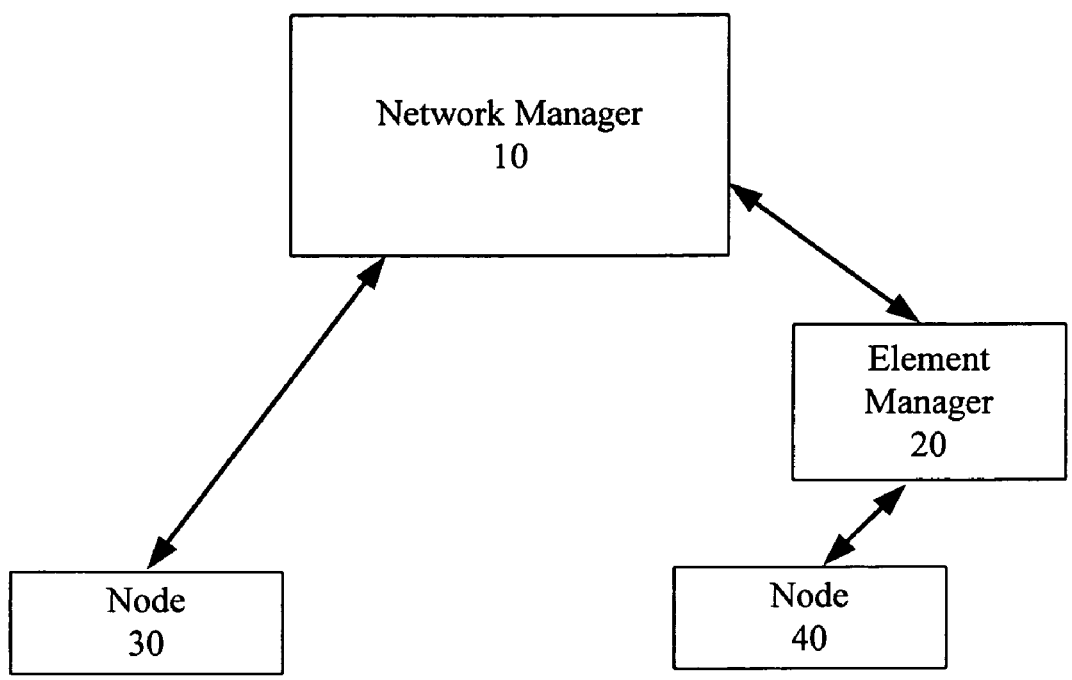
FIG. 1 illustrates a block diagram of a network manager controlling nodes in a network in accordance with the present invention.

The invention can be better understood with reference to FIGS. 1-4. FIG. 1 illustrates a block diagram of a network manager 10 operably coupled to nodes 30 and 40. Preferably, the network manager 10 and the nodes 30 and 40 are included in a communications network that may include a variety of communications formats, including, but not limited to, time division multiplexing (TDM), frame relay (FR), asynchronous transfer mode (ATM), and a number of wireless network formats. Each of the nodes 30 and 40 is intercoupled within the network to allow data transmission from a plurality of sources to a plurality of destinations. The general operation of such communication networks is well known in the art.

The network manager 10 needs to understand the functional characteristics of the various nodes 30 and 40 within the network in order to perform its network management functions. The network management functions performed by the network manager can include such things as determining routing paths in the network, configuring path endpoints in the network, etc. For example, if the network manager 10 is going to turn on virtual path shaping within portions of the network, it needs to understand which nodes within the network support this feature/service.

In prior art solutions, the network manager 10 would receive an indication of the identity or node-type of each of the nodes either directly from the node 30, or through an element manager 20 that is operably coupled to the node 40. In the case where an element manager 20 relays the node type to the network manager 10, the element manager 20 and the node 40 would typically communicate with each other using Simple Network Management Protocol (SNMP), which is standard protocol that is known in the art. These prior art solutions did not include functional characteristics of the particular node in the information conveyed to the network manager, but rather would merely identify the type of node. The network manager 10 would then determine all of the functional characteristics for the particular node by the type of node communicated.

As stated earlier, utilizing the node type to determine functional characteristics can be troublesome when new node types are developed. In order to avoid having to revise the network manager 10 each time new nodes are developed, a set of indicators, preferably in the form of a bit mapped value, is specified that indicates the functional characteristics of each node in the network. The set of indicators corresponding to each node in the network is provided to the network manager, which builds a database based on the various sets of indicators. This database can then be referenced to perform network management functions.

Functional characteristics that may be included in the bit mapped set of indicators include support of virtual path (VP) cross connect, virtual channel (VC) cross connects, VP termination points, VC termination points, SPVC support, VP endpoint continuity checks, VC endpoint continuity checks and end point administration state. Note that these are only a small subset of the various functional characteristics that can be relayed using the set of indicators. As is apparent to one of ordinary skill in the art, the number of indicators included for each node may be increased to support additional functional characteristics.

Figure 2:
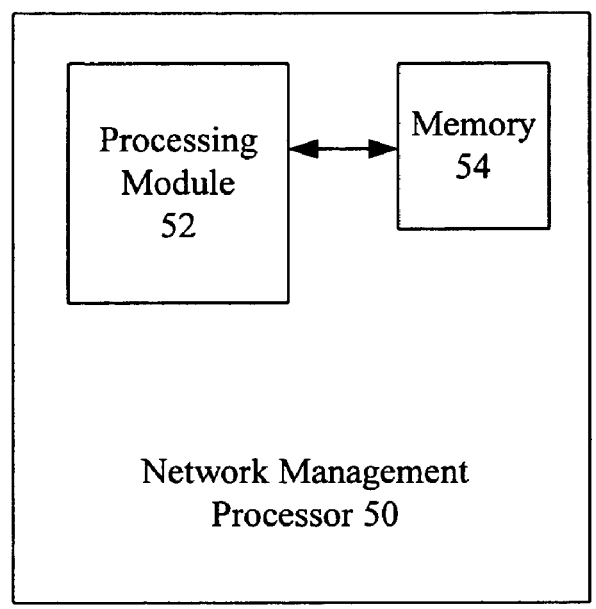
FIG. 2 illustrates a block diagram of a network management processor in accordance with the present invention.

FIG. 2 illustrates a block diagram of a network management processor in accordance with the present invention. The network manager 10 is preferably coupled to, or includes, a network management processor 50. The network management processor 50 includes a processing module 52 and a memory 54. The processing module 52 may include a single processing entity or plurality of processing entities. Such a processing entity may be a microprocessor, microcontroller, digital signal processor, state machine, logic circuitry, or any device that processes information based on operational or programming instructions.

The memory 54 may be a single memory device or plurality of memory devices. Such a memory device may be a read only device, random access memory device, floppy disk, hard drive memory, or any device that stores digital information. Note that when the processing module 52 has one or more of its functions performed by a state machine or logic circuitry, the memory containing the corresponding operational instructions is embedded within the state machine or logic circuitry.

The memory 54 stores programming or operational instructions preferably corresponding to a network management algorithm. Such operational instructions allow the processing module 52 to perform the methods illustrated in FIGS. 3 and 4. It should be noted that the network management processor 50 may be used in conjunction with additional circuitry such that only portions of the methods of FIGS. 3 and 4 are performed using software, whereas other portions are performed by hardware.

Figure 3:
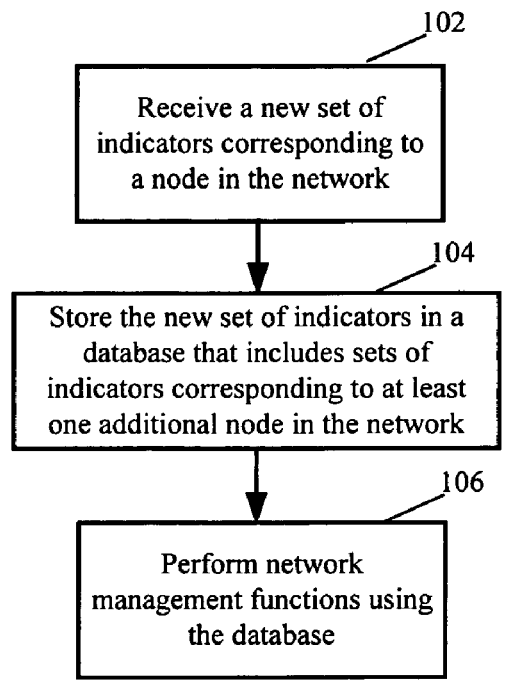
FIG. 3 illustrates a flow diagram of a method for management of a network in accordance with the present invention.
Figure 4:
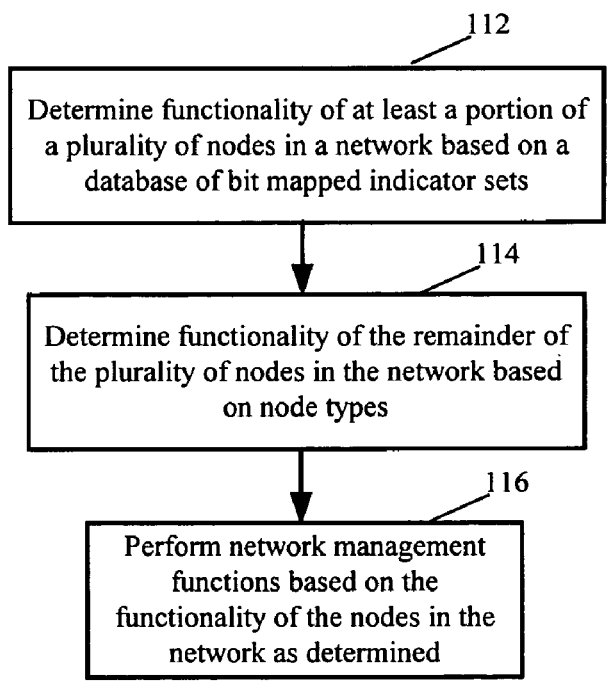
FIG. 4 illustrates a method for performing network management functions in a communications network in accordance with the present invention.

FIG. 3 illustrates a flow diagram of a method for management of a network. The method begins at step 102 where a new set of indicators is received corresponding to a node in the network. The new set of indicators includes functional characteristics of the node and each indicator of the new set of indicators corresponds to a particular functional characteristic. Preferably, each set of indicators includes indicators in a predetermined arrangement where a position in the predetermined arrangement corresponds to representation of a functional characteristic. More preferably, each set of indicators includes a bit mapped value where each bit location in the bit mapped value corresponds to representation of a functional characteristic. Each bit location in the bit mapped value preferably corresponds to a particular functional characteristic, and a bit map template may be used to facilitate such mapping. Note that multiple bit locations may be used in conjunction with a particular functional characteristic. A first bit value (e.g. 0 or 1) indicates that the functional characteristic corresponding to the bit location is supported by a node to which the set of indicators corresponds, whereas the second, or opposite bit value indicates that the functional characteristic is not supported by the node. In one example, if a bit value of 1 is contained in a particular location it may indicate that the functional characteristic corresponding to that location is supported, whereas a 0 may indicate a lack of support for that functional characteristic.

In addition to the functional characteristics communicated through the bit mapped value or field, a number of parameters regarding the node may be communicated. Such parameters include basic parameters such as a node number that will be used to identify the node or network element and a plurality of additional node properties, examples of which are detailed in the following list. Note that the list of parameters below are not new properties, and such information was communicated to the network manager in prior art solutions. However, in such prior art solutions no functional characteristics were communicated in conjunction with the properties listed below.

| Property Name | Description |
| --- | --- |
| NODE_FULL_NAME | This property specifies the full name given to a node. |
| NODE_SHORT_NAME | This property specifies a short name to be given to a node. |
| NODE_TYPE | This property specifies the type of the node (.e.g.. Generic node) |
| NODE_SUB_TYPE | This property specifies the node sub type. (e.g. 36140) |
| NODE_TYPE_STR | This property specifies the type name of the node. |
| NODE_SW_GENERIC_NO | Specifies the node software generic. |
| NODE_INTER_NET_ADDR | Specifies the IP address of the node. An example of the format is 123.345.789.123 |
| NODE_STATUS | This property specifies the status of the node. |
| NODE_CONFIG_PROTOCOL | This property specifies the configuration protocol. How to speak to the node. |
| NODE_NO_OF_SHELVES | This property specifies the number of shelves which make up the node. |
| NODE_SLOTS_PER_SHELF | This property specifies how many slots there are per shelf for this node. |
| NODE_MAX_CONN | This property specifies the maximum number of cross-connections supported on the node. |
| NODE_MAX_CDVT_VALUE | Maximum Cell Delay Variance Time. |
| NODE_MAX_MBS_VALUE | Maximum MBS value. |

Within each node of the network, a number of shelves, cards, devices, and circuits may be supported, where these entities are listed here in order of hierarchy. Thus, a shelf may include a plurality of cards, each card can include a plurality of devices, etc. Each hierarchical layer includes a list of parameters similar to those listed for a node directly above. In addition, each of these different hierarchical levels will have additional functional parameters associated with it, and as such, each instance at each level preferably includes a bit mapped value (set of indicators) in its set of parameters communicated to the network manager that indicates support/non-support of these various features. Preferably, the bit mapped value (set of indicators) for each hierarchical component (e.g. node, shelf, card, device, and circuit) is communicated to the network manager individually. However, as is apparent to one of ordinary skill in the art, the bit mapped values for all of the hierarchical components in a node could be combined in a predetermined, delineated fashion for communication to the network manager such that all of the functional characteristics for the node are communicated to the network manager at once. Partial combinations (e.g. all the bit mapped values for the cards in a particular shelf) could also be used to relay functional information.

Once a new set of indicators corresponding to a node or other entity included within a node in the network is received, the method proceeds to step 104 where the new set of indicators is stored in a database. The database includes sets of indicators corresponding to at least one additional node in the network. At step 106, the database that includes the new set of indicators is utilized to perform network management functions. Such network management functions can include determining routing paths in the network for calls or connections and configuring path endpoints in the network. Configuring path endpoints can include turning on virtual path shaping, performing connection administration, turning on support of switched permanent virtual connections (SPVCs), and performing support of virtual path and virtual connection continuity for diagnostic purposes.

In order to convey the set of indicators corresponding to each node in the network to the network manager, the functional characteristics for each node must first be determined. Based on the functional characteristics as determined, a set of indicators corresponding to these functional characteristics can be generated. Thus, a bit mapped value for the particular node (or hierarchical component included in a node) can be established where certain bits are set to a positive state to indicate support of certain functional characteristics. As before, each indicator of the set of indicators (each bit within the bit mask) corresponds to a particular functional characteristic. Generating the set of indicators preferably includes generating the indicators based on a bit mapped template used by the network management device. The set of indicators may then be combined with any physical characteristic information of the node to produce a set of characteristics that is communicated to the network manager.

By utilizing bit mapped values to ascertain functionality within a node, the functional characteristics of the node can be understood without modifying current decision-making algorithms within the network management device. As such, when new nodes, or switches, are brought to market, network managers will be able to support the new nodes without the need for revision of the network managers.

FIG. 4 illustrates a flow diagram of a method for performing network management functions in a communication network that includes a plurality of nodes. At step 112, the functionality of at least a portion of the plurality of nodes (and possibly also the functionality of the hierarchical component entities of the portion of the plurality of nodes) is determined based on a database of bit mapped indicator sets. Each node that is included in the database has a corresponding bit mapped indicator set that indicates functional characteristics for that node. Any newly developed node for use in the network should be developed to support this type of bit mapped indicator sets.

At step 114, functionality of any remaining switches that are not fully characterized by the database is determined based on node types corresponding to those nodes. Thus, older nodes included in the network that do not support the bit mapped indicator sets are still supported. Because the prior art network managers already support the current set of nodes that do not support the bit mapped indicator sets, additional revisions to the network manager (once new nodes conform to the bit mapped indicator sets) will not be required.

At step 116, network management functions are performed based on functionality of the plurality of nodes as determined at steps 112 and 114. Note that the network management functions that may be performed can vary greatly, and any network function that depends on functional characteristics of the various nodes in the network is assumed to be included. Thus, by relying on the database of bit mapped indicator sets to provide the functionality of at least a portion of the nodes in the network and determining functionality of the remaining nodes in the network based on their node type, functional characteristics of all the nodes in the network can be ascertained and utilized to perform the network management functions.

It should be understood that the implementation of other variations and modifications of the invention and its various aspects should be apparent to those of ordinary skill in the art, and that the invention is not limited to the specific embodiments described. It is therefore contemplated to cover by the present invention, any and all modifications, variations, or equivalents that fall within the spirit and scope of the basic underlying principles disclosed and claimed herein.

What is claimed is:

1. A method for management of a network, comprising:
   receiving a new set of indicators corresponding to a node in the network, wherein the new set of indicators includes functional characteristics of the node, wherein each indicator of the new set of indicators corresponds to a particular functional characteristic;
   storing the new set of indicators in a database, wherein the database includes sets of indicators corresponding to at least one additional node in the network; and
   utilizing the database including the new set of indicators to perform network management functions.

2. The method of claim 1, wherein each set of indicators includes indicators in a predetermined arrangement, wherein position in the predetermined arrangement corresponds to representation of a functional characteristic.

3. The method of claim 2, wherein each set of indicators further comprises a bit mapped value, wherein each bit location in the bit mapped value corresponds to representation of a functional characteristic.

4. The method of claim 1, wherein each set of indicators includes indicators indicating functional support at multiple hierarchical levels within a node to which the set of indicators corresponds.

5. The method of claim 4, wherein the multiple hierarchical levels include at least a portion of a set of levels, wherein the set of levels includes a node level, a shelf level, a card level, a port level, and a circuit level.

6. The method of claim 1, wherein the set of indicators further includes physical characteristics of the node.

7. The method of claim 1, wherein performing network management functions further comprises determining routing paths in the network.

8. The method of claim 1, wherein performing network management functions further comprises configuring path endpoints in the network.

9. The method of claim 1, wherein the network is a communications network that includes one or more of Time Division Multiplexing, Frame Relay, asynchronous transfer mode, and wireless network formats.

10. A method for communicating a set of characteristics of a node in a communications network, comprising:
  determining functional characteristics for the node;
  generating a set of indicators corresponding to the functional characteristics, wherein each indicator of the set of indicators corresponds to a particular functional characteristic; and
  combining the set of indicators with physical characteristic information of the node to produce the set of characteristics for the node.

11. The method of claim 10, wherein generating the set of indicators further comprises generating a bit mapped set of indicators, wherein each bit of the bit mapped set corresponds to a functional characteristic.

12. The method of claim 11, wherein generating the set of indicators further comprises generating the set of indicators based on a bit map template used by a network management device in the communications network.

13. A method for performing network management functions in a communications network that includes a plurality of nodes, comprising:
  determining functionality of at least a portion of the plurality of nodes and component entities of the at least a portion of the plurality of nodes based on a database of bit mapped indicator sets, wherein the at least a portion of the nodes in the communications network are represented by corresponding bit mapped indicator sets, wherein each bit mapped indicator set indicates functional characteristics for a corresponding node;
  when functionality of the plurality of nodes is not fully characterized by the database, determining functionality of a remainder portion of the plurality of nodes based on node types corresponding to nodes included in the remainder portion of the plurality of nodes; and
  performing network management functions based on functionality of the plurality of nodes as determined.

14. The method of claim 13, wherein performing network management functions further comprises determining routing paths in the communications network.

15. A network management processor, comprising:
  a processing module; and
  memory operably coupled to the processing module, wherein the memory includes operating instructions that cause the processing module to:
    store a received new set of indicators in a database, wherein the new set of indicators corresponds to a node in a network, wherein the database includes indicators corresponding to at least one additional node in the network, wherein the new set of indicators includes functional characteristics of the node, wherein each indicator of the new set of indicators corresponds to a particular functional characteristic; and
    perform network management functions based on the database including the new set of indicators.

16. The network management processor of claim 15, wherein each set of indicators includes indicators in a predetermined arrangement, wherein position in the predetermined arrangement corresponds to representation of a functional characteristic.

17. The network management processor of claim 16, wherein each set of indicators further comprises a bit mapped value, wherein each bit location in the bit mapped value corresponds to representation of a functional characteristic.

18. The network management processor of claim 15, wherein each set of indicators includes indicators indicating functional support at multiple hierarchical levels within a node to which the set of indicators corresponds.

19. The network management processor of claim 15, wherein performing network management functions further comprises determining routing paths in the network.

20. A network management processor for performing network management functions in a communications network that includes a plurality of nodes, comprising:
  a processing module; and
  memory operably coupled to the processing module, wherein the memory includes operating instructions that cause the processing module to:
    determine functionality of at least a portion of the plurality of nodes and component entities of the at least a portion of the plurality of nodes based on a database of bit mapped indicator sets, wherein the at least a portion of the nodes in the communications network are represented by corresponding bit mapped indicator sets, wherein each bit mapped indicator set indicates functional characteristics for a corresponding node;
    when functionality of the plurality of nodes is not fully characterized by the database, determine functionality of a remainder portion of the plurality of nodes based on node types corresponding to nodes included in the remainder portion of the plurality of nodes; and
    perform network management functions based on functionality of the plurality of nodes as determined.

21. The network management processor of claim 20, wherein performing network management functions further comprises determining routing paths in the communications network.

22. The method of claim 10, wherein each set of indicators includes indicators in a predetermined arrangement, wherein position in the predetermined arrangement corresponds to representation of a functional characteristic.

* * * * *